US011018998B1

(12) United States Patent
Knas et al.

(10) Patent No.: US 11,018,998 B1
(45) Date of Patent: May 25, 2021

(54) SYSTEMS AND METHODS FOR CHAT SESSIONS INVOLVING MULTIPLE CHATBOTS

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US); Payton A. Shubrick, Springfield, MA (US); Damon Ryan Depaolo, Barkhamsted, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 330 days.

(21) Appl. No.: 16/124,003

(22) Filed: Sep. 6, 2018

Related U.S. Application Data

(60) Provisional application No. 62/555,256, filed on Sep. 7, 2017, provisional application No. 62/555,500, filed on Sep. 7, 2017.

(51) Int. Cl.
*G06F 15/16* (2006.01)
*H04L 12/58* (2006.01)
*G06F 40/58* (2020.01)
*H04L 29/06* (2006.01)

(52) U.S. Cl.
CPC .............. *H04L 51/02* (2013.01); *G06F 40/58* (2020.01); *H04L 67/42* (2013.01)

(58) Field of Classification Search
CPC .......... H04L 51/02; H04L 67/42; G06F 40/58
USPC ........................................................ 709/206
See application file for complete search history.

(56) References Cited

U.S. PATENT DOCUMENTS

| 2003/0220972 | A1* | 11/2003 | Montet ................... H04L 51/04 709/204 |
| 2015/0185996 | A1 | 7/2015 | Brown et al. |
| 2016/0092522 | A1 | 3/2016 | Harden et al. |
| 2016/0094507 | A1 | 3/2016 | Li et al. |
| 2017/0180284 | A1 | 6/2017 | Smullen et al. |
| 2017/0310613 | A1 | 10/2017 | Lalji et al. |
| 2018/0025085 | A1* | 1/2018 | Sarangi ................... H04L 67/02 707/722 |
| 2018/0287968 | A1* | 10/2018 | Koukoumidis ....... G06F 16/248 |
| 2018/0307687 | A1 | 10/2018 | Natkin et al. |

* cited by examiner

*Primary Examiner* — Atta Khan
(74) *Attorney, Agent, or Firm* — Foley & Larnder LLP

(57) ABSTRACT

Generally, this disclosure enables a chatbot to host a chat session with a user. In some implementations, when the chatbot is not able to or does not know an answer to a query from the user, then the chatbot can import another chatbot into the chat session such that the user is aware of such importation and such that the other chatbot can output the answer to the query into the chat session. In other implementations, when the chatbot is not able to or does not know the answer to the query from the user, then the chatbot can query another chatbot, in background, without notifying the user, and when the response is received from the other chatbot, the chatbot can output that response to the user seamlessly such that the user is not aware of such querying.

17 Claims, 4 Drawing Sheets

SYSTEMS AND METHODS FOR CHAT SESSIONS INVOLVING MULTIPLE CHATBOTS

CROSS-REFERENCE TO RELATED APPLICATIONS

This application claims a benefit of priority to U.S. Provisional Patent Application 62/555,256, filed on Sep. 7, 2017, and a benefit of priority to U.S. Provisional Patent Application 62/555,500, filed on Sep. 7, 2017, all of which are incorporated by reference herein for all purposes.

TECHNICAL FIELD

Generally, this disclosure relates to chatbots. More particularly, this disclosure relates to chat sessions involving multiple chatbots.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

A chatbot can host a chat session with a user in order to help the user with a task, such as e-commerce, consulting, counseling, or others. However, there is a possibility of a scenario when the chatbot is not able to adequately assist the user with the task, such as due to the chatbot not being adequately programmed for the task. For example, the chatbot may not be able to provide an adequate response to a query submitted by the user. Although the user can look up a topic related to the task or to the query during the chat session or conduct a plurality of chat sessions simultaneously with a plurality of chatbots, the user still needs to switch back-and-forth between a plurality of tabs, windows, user interfaces, applications, chat sessions, or devices, which is inconvenient, distracting, mentally draining, and time-consuming. As such, there is a desire to solve this technical problem.

SUMMARY

In an embodiment, there is provided a method comprising: reading, by a server, a first chat message from a client in a chat session involving the client and a first chatbot; identifying, by the server, a request to invite a second chatbot into the chat session, wherein the request is identified from the first chat message; locating, by the server, a reference to the second chatbot during the chat session responsive to the request; calling, by the server, the reference during the chat session responsive to the request; passing, by the server, a set of parameters for the chat session to the second chatbot during the chat session based on the reference responsive to the request; granting, by the server, an access for the chat session to the second chatbot during the chat session based on the set of parameters responsive to the request such that the second chatbot joins the chat session and the chat session involves the client, the first chatbot, and the second chatbot; and inserting, by the server, a second chat message from the second chatbot into the chat session during the chat session based on the access responsive to the request, wherein the first message precedes the second message during the chat session.

In an embodiment, there is a provided a system comprising: a server configured to: read a first chat message from a client in a chat session involving the client and a first chatbot; identify a request to invite a second chatbot into the chat session, wherein the request is identified from the first chat message; locate a reference to the second chatbot during the chat session responsive to the request; call the reference during the chat session responsive to the request; pass a set of parameters for the chat session to the second chatbot during the chat session based on the reference responsive to the request; grant an access for the chat session to the second chatbot during the chat session based on the set of parameters responsive to the request such that the second chatbot joins the chat session and the chat session involves the client, the first chatbot, and the second chatbot; and insert a second chat message from the second chatbot into the chat session during the chat session based on the access responsive to the request, wherein the first message precedes the second message during the chat session.

In an embodiment, there is a provided a method comprising: reading, by a server, a chat query from a client in a chat session involving the client and a first chatbot; identifying, by the server, a reference to a second chatbot during the chat session responsive to the first chatbot at least one of not being able to answer the chat query during the chat session or not knowing the answer to the chat query during the chat session; generating, by the server, a chatbot query during the chat session based on the chat query and the reference responsive to the chat query; submitting, by the server, the chatbot query to the second chatbot during the chat session based on the reference responsive to the chat query; receiving, by the server, a response to the chatbot query from the second chatbot during the chat session responsive to the chat query; converting, by the server, the response into a chat message during the chat session responsive to the chat query; and inserting, by the server, the chat message into the chat session during the chat session responsive to the chat query, wherein the chat query precedes the chat message, wherein the chat message is associated with the first chatbot during the chat session.

In an embodiment, there is provided a system comprising: a server configured to: read a chat query from a client in a chat session involving the client and a first chatbot; identify a reference to a second chatbot during the chat session responsive to the first chatbot at least one of not being able to answer the chat query during the chat session or not knowing the answer to the chat query during the chat session; generate a chatbot query during the chat session based on the chat query and the reference responsive to the chat query; submit the chatbot query to the second chatbot during the chat session based on the reference responsive to the chat query; receive a response to the chatbot query from the second chatbot during the chat session responsive to the chat query; convert the response into a chat message during the chat session responsive to the chat query; and insert the chat message into the chat session during the chat session responsive to the chat query, wherein the chat query precedes the chat message, wherein the chat message is associated with the first chatbot during the chat session.

DESCRIPTION OF DRAWINGS

The set of accompanying illustrative drawings shows various embodiments of this disclosure. Such drawings are

DETAILED DESCRIPTION

This disclosure is now described more fully with reference to the set of accompanying drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Generally, this disclosure enables a chatbot to host a chat session with a user. In some implementations, when the chatbot is not able to or does not know an answer to a query from the user, then the chatbot can import another chatbot into the chat session such that the user is aware of such importation and such that the other chatbot can output the answer to the query into the chat session. In other implementations, when the chatbot is not able to or does not know the answer to the query from the user, then the chatbot can query another chatbot, in background, without notifying the user, and when the response is received from the other chatbot, the chatbot can output that response to the user seamlessly such that the user is not aware of such querying.

Figure 1:
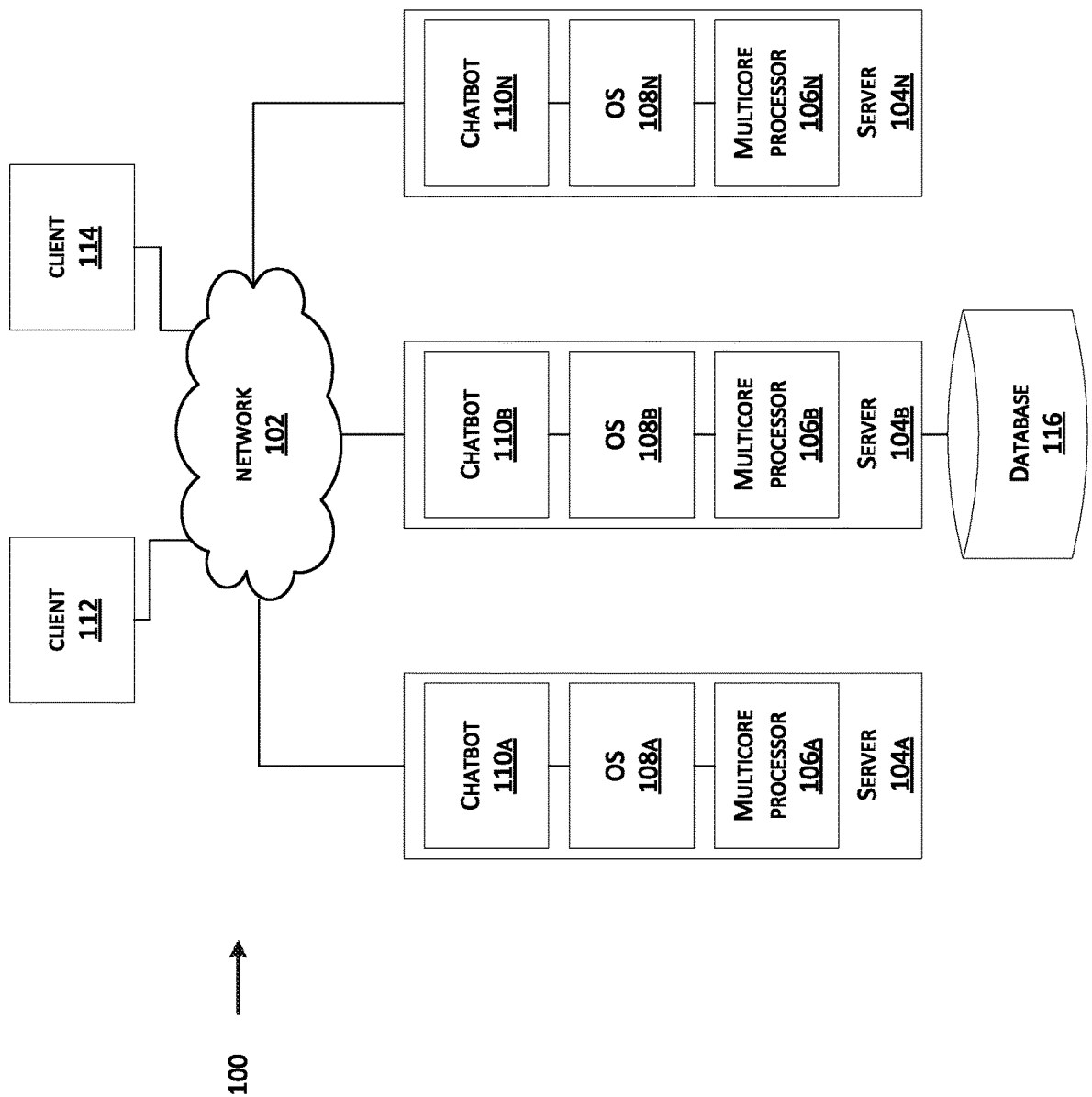
FIG. 1 shows a schematic diagram of an embodiment of a network topology according to this disclosure.

FIG. 1 shows a schematic diagram of an embodiment of a network topology according to this disclosure. In particular, a network topology 100 comprises a network 102, a plurality of servers 104, a first client 112, a second client 114, and a database 116. The servers 104 include the server 104a, the server 104b, and server 104n. Note that any connections of the network topology 100 can be direct or indirect.

The network 102 includes a plurality of nodes that allow for sharing of resources or information. The network 102 can be wired, waveguide, wireless, or others. For example, the network 102 can be a local area network (LAN), a wide area network (WAN), a cellular network, a satellite network, a personal area network (PAN), a fiber optic network, or others.

For each of the servers 104, the server 104 includes a multicore processor 106, a memory in communication with the processor 106, and a transceiver in communication with the processor 106. The memory stores an operating system (OS) 108 and a chatbot 110. The transceiver, such as a transmitter and a receiver, signally communicates with the network 102, whether in a wired, waveguide, or wireless manner. The OS 108, such as MacOS or Windows, runs on the processor 106. The chatbot 110 runs on the OS 108.

The server 104 can include and/or be coupled to an input device, such as a mouse, a keyboard, a camera, whether forward-facing and/or back-facing, an accelerometer, a touchscreen, a biometric reader, a clicker, a microphone, or any other suitable input device. The server 104 can include and/or be coupled to an output device, such as a display, a speaker, a headphone, a printer, or any other suitable output device. In some embodiments, the input device and the output device can be embodied in one unit, such as a touch-enabled display, which can be haptic.

The processor 106 comprises a plurality of independent cores. For example, the processor 106 is a computing component with two or more independent processing units, which are the units that read and execute program instructions, such as the chatbot 110, such as via multiprocessing or multithreading. The instructions are processing instructions, such as add, move data, or branch, but the cores can run multiple instructions concurrently, thereby increasing an overall operational speed for the chatbot 110, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably. For example, a data structure can be accessed, such as read or written, via at least two cores concurrently without locking the data structure between such cores. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Some network topologies to interconnect cores include bus, ring, two-dimensional mesh, and crossbar. Homogeneous multi-core systems include only identical cores, and heterogeneous multi-core systems can have cores that are not identical. The cores in multi-core systems may implement architectures, such as very long instruction word (VLIW), superscalar, vector, or multithreading.

The chatbot 110 includes a chatbot logic programmed to simulate human conversation via auditory, such via sound, or textual, such as via chat, methods through artificial intelligence (AI). The chatbot 110 can employ a natural language processing (NLP) technique or scan for flags or keywords within an input and then respond, such as via pulling a reply, with a matching keyword or a similar wording pattern from a database, which may be stored locally or remotely. For example, the server 104 can host the database, which may be of any type, such as graphical, in-memory, relational, post-relational, or others. Alternatively, the database is hosted remotely and given remote access, such as read or write access. For example, the NLP technique can include lemmatization, morphological segmentation, stemming, lexical semantics, machine translation, sentiment analysis, relationship extraction, topic segmentation, word sense disambiguation, summarization, conference resolution, discourse analysis, or others.

At least one of the servers 104, such as the server 104b, is in communication with a database 116, such as via a database management system (DBMS) local to or remote from the server 104b. Although the database 116 can be external to the server 104b, as shown in FIG. 1, in other implementations, the server 104b can host the database 116 such that the database 116 is internal to the server 104b. The database 116 may be of any type, such as graphical, in-memory, relational, post-relational, NoSQL, or others. The database 116 contains a plurality of records, which may be indexed, where each of the records may include a plurality of fields, as context appropriate.

The client 112 includes a multicore processor, a memory in communication with the processor, and a transceiver in communication with the processor. The memory stores an OS and an application, such as a mobile app. The transceiver, such as a transmitter and a receiver, signally communicates with the network 102, whether in a wired, waveguide, or wireless manner. The OS, such as MacOS or Windows, runs on the processor. The application runs on the OS. For example, the application can include a browser, such as Chrome, Firefox, Silk, or others. The client 112 can include and/or be coupled to an input device, such as a mouse, a keyboard, a camera, whether forward-facing and/or back-facing, an accelerometer, a touchscreen, a biometric reader, a clicker, a microphone, or any other suitable input device. The client 112 can include and/or be coupled to an output device, such as a display, a speaker, a headphone, a printer, or any other suitable output device. In some embodiments, the input device and the output device can be embodied in one unit, such as a touch-enabled display, which can be haptic. For example, the client 112 can include a mobile phone, a tablet, a laptop, a desktop, a vehicle, whether land, aerial, marine, or space, or others.

The client 114 includes a multicore processor, a memory in communication with the processor, and a transceiver in communication with the processor. The memory stores an OS and an application, such as a mobile app. The transceiver, such as a transmitter and a receiver, signally communicates with the network 102, whether in a wired, waveguide, or wireless manner. The OS, such as MacOS or Windows, runs on the processor. The application runs on the OS. For example, the application can include a browser, such as Chrome, Firefox, Silk, or others. The client 114 can include and/or be coupled to an input device, such as a mouse, a keyboard, a camera, whether forward-facing and/or back-facing, an accelerometer, a touchscreen, a biometric reader, a clicker, a microphone, or any other suitable input device. The client 114 can include and/or be coupled to an output device, such as a display, a speaker, a headphone, a printer, or any other suitable output device. In some embodiments, the input device and the output device can be embodied in one unit, such as a touch-enabled display, which can be haptic. For example, the client 114 can include a mobile phone, a tablet, a laptop, a desktop, a vehicle, whether land, aerial, marine, or space, or others.

In one mode of operation, the server 104a hosts a first chatbot 110a in a chat session with the client 112, such as over the network 102. The server 104a enables, during the chat session, the first chatbot 110a to: receive a first input from the client 112; apply a logic to the first input; identify a reference to a second chatbot 110b not hosted by the server 104a; call the reference; pass a set of parameters for the chat session to the second chatbot 110b; grant an access for the chat session to the second chatbot 110b; receive a second input from the second chatbot 110b; and insert the second input into the chat session for the client 112 to access. The server 104a can host the logic, such as when the first chatbot 110a hosts the logic, or the logic can be hosted remote from the server 104a, such as via a data source, such as a data feed or another server. When a permission to extend an invitation to the second chatbot 110b is desired, the first chatbot 110a can generate a user prompt during the chat session, where the prompt is inquisitive of querying the second chatbot 110b, where the prompt is programmed to receive a third input from the client 112; the first chatbot 110a can present the prompt during the chat session to the client 112; and receive the third input from the client 12 during the chat session, where the first chatbot 110a applies the logic responsive to the third input, which may be binary, such as yes or no. The server 104a, such as via the first chatbot 110a, can modify, during the chat session, a page presenting the chat session such that a first identifier, such as a bot name or a bot graphic, and a second identifier, such as a bot name or a bot graphic, are concurrently presented on the page based on the grant of the access, where the first identifier corresponds to first chatbot 110a and the second identifier corresponds to the second chatbot 110b. The server 104a, such as via the first chatbot 110a, can modify via concurrently presenting a first frame on the page and a second frame on the page, where the first frame contains the first identifier and the second frame contains the second identifier. The server 104a can inserting, during the chat session, the second input into a third frame, such as a main chat window, presented on the page such that the third frame contains the first input and the second input. When the second chatbot 110b is associated with an application programming interface (API), then the first chatbot 110a passes the set of parameters via interfacing with the API. The API is local to the second chatbot 110b, such as when the second chatbot 110b includes the API, or the API is remote from the second chatbot 110b, such as via a data source, such as a data feed or another server. The server 104a can translate, such as via the first chatbot 110a, during the chat session, the set of parameters into a set of instructions executable via the second chatbot 110b, where the first chatbot 110a passes the set parameters through the set of instructions. The server 104a can train, during the chat session, the first chatbot 110a based on the second input, such as in order to minimize situations when querying the second chatbot 110b is needed. Note that the set of parameters passed from the first chatbot 110a to the second chatbot 110b can include the first input. The server 104a can generate, during the chat session, the set of parameters based on the first input before the first chatbot 110a passes the set of parameters to the second chatbot 110b. When the first chatbot 110a and the second chatbot 110b are programmed to receive user inputs in different user languages, such as English and Russian, the server 104a can translate the first input from a first language, such as English, into a text in a second language, such as Russian, where the set of parameters includes the text in the second language, i.e. Russian. Note that the server 104a can translate the second input translated from Russian into English before presenting in the chat session, such as when the second chatbot 110b outputs in Russian. Note that these languages are illustrative and other languages can be used, such as Arabic, Hispanic, French, German, Japanese, Hebrew, Korean, Hindi, and others. In situations when the second chatbot 110b is not able to respond to the first input, then the second chatbot 110b can be programmed to submit a query to a data source, such as a third chatbot 110n not hosted via the server 104a based on the set of parameters and to receive a response to the query, where the second input includes the response. In situations when supervisory input is desired, then the first chatbot 110a can be programmed to apply a logic to the second input during the chat session, prompt the client 112 for extending an invitation to at least one of a client 114 or a chatbot 104n during the chat session, receive a response to the invitation during the chat session, invite at least one of the client 114 or the chatbot 104n to the chat session during the chat session, grant a second access for the chat session to at least one of the client 114 or the chatbot 104n.

In another mode of operation, the server 104a hosts a first chatbot 110a in a chat session with the client 112, such as over the network 102. The server 104a enables, during the chat session, the first chatbot 110a to: receive an input from the client 112; apply a logic to the input; identify a reference to a second chatbot 110b not hosted by the server; generate a query based on the input and the reference; submit the query to the second chatbot 110b based on the reference; receive a response to the query from the second chatbot 110b; and present the response to the client 112, such that the client is not aware of the first chatbot 110a submitting the query to the second chatbot 110b. The server 104a can host the logic, such as when the first chatbot 110a hosts the logic, or the logic can be hosted remote from the server 104a, such as via a data source, such as a data feed or another server. When a permission to query the second chatbot 110b is desired, then the first chatbot 110a can generate a prompt during the chat session, where the prompt is inquisitive of querying the second chatbot 110b, where the prompt is programmed to receive a second input from the client; present the prompt during the chat session to the client 112; and receive the second input from the client 112 during the chat session, where the first chatbot 110a applies the logic responsive to the second input, which may be binary, such as yes or no. When the second chatbot 110b is associated with an API, then the first chatbot 110a submits the query to the second chatbot 110b via interfacing with the API. The API can be local to the second chatbot 110b, such as when the second chatbot includes the API, or the API is remote from the second chatbot 110b. The server 104a can translate, such as via the first chatbot 110a, during the chat session, the query into a set of instructions executable via the second chatbot 110b, where the first chatbot 110a submits the query through the set of instructions. The server 104a can train, during the chat session, the first chatbot based on the response, such as in order to minimize situations when querying the second chatbot 110b is needed. Note that the query can include the input. When the first chatbot 110a and the second chatbot 110b are programmed to receive user inputs in different user languages, such as Hindi and Korean, the server 104a can translate the input from a first language, such as Hindi, into a text in a second language, such as Korean, where the query includes the text in the second language, i.e., Korean. Note that the server 104a can translate the response translated from Korean into Hindi before presenting in the chat session, such as when the second chatbot 110b outputs in Korean. Note that these languages are illustrative and other languages can be used, such as Arabic, Hispanic, French, German, Japanese, Hebrew, Russian, and others. In situations when the second chatbot 110b is not able to respond to the first input, then the second chatbot 110b can be programmed to query a data source, such as a third chatbot not hosted via the server 104a, based on the query and to receive a reply in response thereto, where the response includes the reply. In situations when supervisory input is desired, then the first chatbot 110a can be programmed to apply a logic to the response during the chat session, prompt the client 112 for extending an invitation to at least one of a client 114 or a third chatbot 110n during the chat session, receive a reply to the invitation during the chat session, invite at least one of the client 114 or the third chatbot 110n to the chat session during the chat session, grant an access for the chat session to at least one of the client 114 or the third chatbot 110n.

Figure 2:
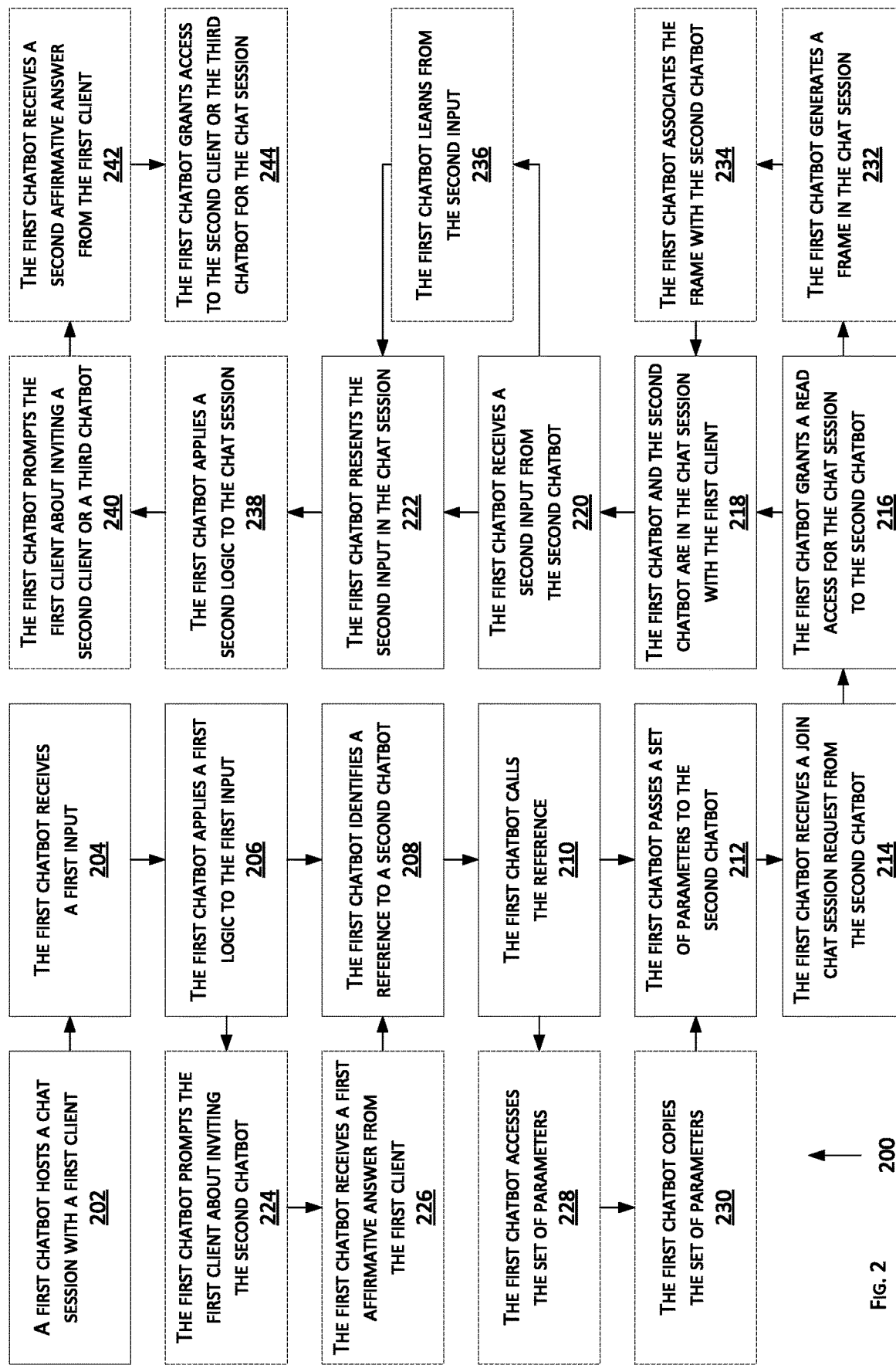
FIG. 2 shows a flowchart of an embodiment of a process for a first chatbot granting access for a chat session to a second chatbot according to this disclosure.

FIG. 2 shows a flowchart of an embodiment of a process for a first chatbot granting access for a chat session to a second chatbot according to this disclosure. In particular, a process 200 is used for the first chatbot 110a granting access for the chat session to the second chatbot 110b. The process 200 includes a plurality of blocks 202-244.

In the block 202, the first chatbot 110a hosts the chat session with the first client 112. Note that the chat session can be implemented via a hypertext markup language (HTML), JavaScript, Flash, ActiveX, Java, or other technologies.

In the block 204, the first chatbot 110a receives a first input, such as an alphanumeric string, an audio file, an image file, a barcode, or others. For example, the alphanumeric string can include a query, such as "What material is this camping tent made from?" Note that the first input can be received when the client 112 is accessing a web page associated with a specific database record, such as an e-commerce product, whether good or service, such that the specific database record or the web page is bound to the chat session.

In the block 206, the first chatbot 110a applies a first logic to the first input. The server 104a can host the first logic, such as via the first chatbot 110a hosting the first logic, or the first logic can be hosted remote to the server 104a, such as via a data source, such as a server, over the network 102. Note that the first logic can be hardware or software. For example, the first logic can include a Boolean logic, a causal conditional logic, or any other logic implemented in a circuit, a data structure, a function, a routine, a class, an object, a library, a module, a source code, an object code, or others. For example, the first logic can be embodied in an AI logic. For example, the first logic can analyze the first input based on keywords, alphanumeric string patterns, values, image patterns, sound patters, or any other content in the first input or metadata in the or about the first input. Note that the first logic can be configured to process the first input for understanding the first input, such as via applying an natural language processing (NLP) technique, a machine learning technique, an optical character recognition technique, or any other computational technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. For example, the first logic can disambiguate the first input. Accordingly, once the first input is processed for understanding, the first logic can determine whether the first logic can provide a response to the first input. If the first logic determines that the first logic is able to provide the response, then the first logic outputs the response to the client 112 in the chat session. Otherwise, the first logic determines that the first logic is unable to provide the response to the first input.

In the block 208, the first chatbot 110a identifies a reference to the second chatbot 110b. For example, the reference can include an alphanumeric, binary, or hexadecimal string, an image or sound file, a barcode, a document, a registry entry, an application setting, or others. The reference can include a logical address, a network address, a chatbot identifier or name, or a hyperlink that refers to the second chatbot 110b. For example, the reference can include a value that enables the first chatbot 110a to access the second chatbot 110b by referring to the second chatbot 110b. The first chatbot 110a identifies the reference based on the first logic or via the first logic. The first chatbot 110a identifies the reference as statically preset or as dynamically selected from a set of chatbot references accessible to the first chatbot 110a, such as when the set of chatbot references is local to the server 104a, such as via the first chatbot 110a hosting the set of chatbot references, or remote from the server 104a, such as via a data source, such as a server, over the network 102. For example, when the chatbot reference is statically preset, then the first chatbot 110a identifies the chatbot reference to the second chatbot 110b, as preprogrammed, such as via a one-to-one correspondence therebetween, such as when the second chatbot 110b is smarter than the first chatbot 110a or the second chatbot 110b has access to data or logic, whether local to or remote therefrom, to which the first chatbot 110a does not. In contrast, when the chatbot reference is dynamically selected from the set of chatbot references, then the first chatbot 110a applies a set of criteria, whether local to or remote from the first chatbot 110a, to the first input and then matches an output from such application to a set of variables one-to-one corresponding to the set of the chatbot references, such as via a hash manner, in order to determine which chatbot reference from the set of chatbot references should be selected or is most suitable. For example, when the chatbot reference is statically preset, then the first chatbot 110a can identify the reference to the second chatbot 110b since the first chatbot 110a is programmed to do so. In contrast, when the reference is dynamically selected from the set of chatbot references, then the first chatbot 110a applies the set of criteria to the first input, such as a set of knowledge category criteria stored local to the first chatbot 110a, and then matches an output of such application, such as an alphanumeric value, to the set of variables one-to-one corresponding to the set of the chatbot references, such as a set of alphanumeric values or others. For example, if the output of such application is a value 3, then the first chatbot 110a determines if the value 3 matches to any member of the set of variables. If so, then the first chatbot 110a identifies which chatbot reference from the set of chatbot references corresponds to that matching member. Note that the set of chatbot references can include a catchall chatbot reference or a default chatbot reference for use cases where such matching is not made or for use in default circumstances. Also, note that the set of variables can be adjusted, such as via a maintenance update.

In the block 210, the first chatbot 110a calls the reference, such as via invoking the reference, a statement corresponding to the reference, a routine or a subroutine involving the reference, or others.

In the block 212, the first chatbot 110a passes, such as sends, a set of parameters to the second chatbot 110b, such as over the network 102. For example, the passing can be synchronous or asynchronous, encrypted or unencrypted, or any other way, such as via a Representation State Transfer (REST) API. When the second chatbot 110b is associated with an API, then the first chatbot 110a passes the set of parameters via interfacing with the API. The API is local to the second chatbot 110b, such as when the second chatbot 110b includes the API, or the API is remote from the second chatbot 110b, such as via a data source, such as a data feed or another server. The server 104a can translate, such as via the first chatbot 110a, during the chat session, the set of parameters into a set of instructions executable via the second chatbot 110b, where the first chatbot 110a passes the set parameters through the set of instructions. For example, the first chatbot 110a can pass the set of parameters via a JavaScript Object Notation (JSON) data structure.

The set of parameters can include a set of chat session parameters, such as a session identifier (ID), a session type, a session time, a session date, a session time zone, a session language, a session address, a session name, a set of session party IDs, a session access type, an expected session time duration, a session language, a set of session party device type, a session resume value, the first input, in original or converted or translated form, or others, as known to skilled artisans. For example, the set of parameters can be a callback, such as an executable code that is passed as an argument to another code, which is expected to call back (execute) the argument at a given time, such as responsively, where this execution may be immediate, such as in a synchronous callback, or not immediate, such as at a later time, such as in an asynchronous callback, where the executable code specifies a function or subroutine as an entity that may be similar to a variable and as implementably supported via a subroutine, a lambda expression, a code block, or a function pointer.

When the first chatbot 110a and the second chatbot 110b are programmed to receive user inputs in different user languages, such as English and Russian, the server 104a can translate the first input from a first language, such as English, into a text in a second language, such as Russian, where the set of parameters includes the text in the second language, i.e. Russian. Note that the server 104a can translate the second input translated from Russian into English before presenting in the chat session, such as when the second chatbot 110b outputs in Russian. Note that these languages are illustrative and other languages can be used, such as Arabic, Hispanic, French, German, Japanese, Hebrew, Korean, Hindi, and others. For example, such translation can occur via the server 104a or the server 104b querying a network-based translation service, such as Google Translate, or query a language pack or a translation engine accessible to the server 104a, whether locally or remotely stored.

In the block 214, the first chatbot 110a receives a join chat session request from the second chatbot 110b, such as over the network 102. For example, the second chatbot 110b receives the set of parameters from the first chatbot 110a, processes the set of parameters, generates the join chat session request, and sends the joint chat session request to the first chatbot 110a. The join chat session request can request an access, such as a read access, a write access, a delete access, or other access, from the first chatbot 110a for the chat session. Note that the first chatbot 110a can still maintain control of the chat session over the second chatbot 110b, such as via having higher privileges to the chat session than the second chatbot 110b. However, in other embodiments, the first chatbot 110a and the second chatbot 110b have equal privileges for the chat session or the first chatbot 110a can grant higher privileges for the chat session to the second chatbot 110b such that the second chatbot 110b maintains control of the chat session over the first chatbot 110a.

In the block 216, the first chatbot 110a grants at least a read access for the chat session to the second chatbot 110b such that the second chatbot 110b is logically bound to the chat session. Note that the second chatbot 110b can also be bound to other chat sessions with other clients in parallel to the chat session, just like the first chatbot 110a. For example, such grant can be performed via the first chatbot 110a granting the read access to the second chatbot 110b such that the second chatbot 110b accesses the server 104a and reads at least a part of the chat session starting from the first input, although the first chatbot 110a can grant the read access to the chat session, as a whole, such as from a beginning of the chat session. The first chatbot 110a can grant the read access in various ways, as known to skilled artisans, such as via opening a computer port (a physical hardware interface) of the server 104a or a networking port (a virtual data connection between the first chatbot 110a and the second chatbot 110b), configuring a firewall to accept a connection with the second chatbot 110b, or others. In some embodiments, the first chatbot 110a can grant the read access via passing on at least a part of the chat session to the second chatbot 110b, such as from the first input or earlier, or creating an intermediary virtual chat between the first chatbot 110a and the second chatbot 110b, such as when the second chatbot 110b is not programmed to join the chat session.

In the block 218, the first chatbot 110a and the second chatbot 110b are concurrently present in the chat session such that the user of the client 112 is able to visibly notice the first identifier associated with the first chatbot 110a and the second identifier associated with the second chatbot 110b, such as in different frames or same frame of the chat session.

In the block 220, the first chatbot 110a receives a second input from the second chatbot 110b. Due to the grant of the read access, the second chatbot 110b can read at least a portion of the chat session, such as starting from the first input or earlier, process that portion, including the first input, determine an answer to that portion, such as via internal logic or querying another chatbot, such as a third chatbot 110n, or the database 116, whether local or remote therefrom, generate the second input, and input the second input to the first chatbot 110a over the network 102 for entry into the chat session. Note that in situations when the second chatbot 110b is not able to respond to the first input, then the second chatbot 110b can be programmed to submit a query to a data source, such as a third chatbot 110n not hosted via the server 104a based on the set of parameters and to receive a response to the query, where the second input includes that response.

In the block 222, the first chatbot 110a presents the second input in the chat session, such as via insertion, such as via writing, of the second input into the chat session such that the user of the client 112 visually associates the second input with the second chatbot 110b. In other embodiments, the second chatbot 110b can input the answer into the chat session over the network 102, without involving the first chatbot 110a.

In the block 224, the first chatbot 110a can prompt the user of the client 112 about inviting the second chatbot 110b, such as when the first chatbot 110a is not able to or not programmed to answer the first input. The first chatbot 110a can generate the prompt and present the prompt during the chat session, such as in a conversation window, a pop-up window, a slide-out window, a buddy list, a browser window, a taskbar, a dropdown, or others. The prompt can request a user input of any type, such as a binary input, such as yes/no or true/false, a text input, such as an alphanumeric string ("I would like to ask another chatbot"), a microphone input, a camera input, a mouse/touch gesture, or others. However, note that prompting the user is optional and the first chatbot 110a can import the second chatbot 110b seamlessly, without prompting the user.

In the block 226, the first chatbot 110a receives a first affirmative answer from the client 112 over the network 102. The answer acknowledges the user's desire to get the second chatbot 110b involved, such as by presenting the first input to the second chatbot 110b during the chat session.

In the block 228, the first chatbot 110a accesses the set of parameters. For example, the first chatbot 110a can generate the set of parameters for the chat session, such as upon initiation of the chat session, store the set of parameters local to the first chatbot 110a or remote from the first chatbot 110a, and read the set of parameters, as stored.

In the block 230, the first chatbot 110a copies the set of parameters, such as from a local chat session data store or log, as originally created for the session, whether persistent or non-persistent.

In the block 232, the first chatbot 110a generates a frame in the chat session, such as for dedication to the second chatbot 110b, such as via the second chatbot identifier. The frame can be in any location of a window hosting the chat session. Note that the frame may be different from another frame containing the chat conversation or buddy list. In some embodiments, the frame is a pop-up or a slide-out window, which may be external to the page hosting the chat session.

In the block 234, the first chatbot 110a associates the frame with the second chatbot 110b. For example, the first chatbot 110a can modify, during the chat session, the page presenting the chat session such that the first identifier, such as a bot name or a bot graphic, and the second identifier, such as a bot name or a bot graphic, are concurrently presented on the page based on the grant of the access, where the first identifier corresponds to first chatbot 110a and the second identifier corresponds to the second chatbot 110b. The first chatbot 110a can modify the page via concurrently presenting the first frame on the page and a second frame on the page, where the first frame contains the first identifier and the second frame contains the second identifier. Note that the first chatbot 110a can insert, during the chat session, the second input into a third frame, such as a conversation window, presented on the page such that the third frame contains the first input and the second input.

In the block 236, the first chatbot 110a learns from the second input such that when similar or same query such as the first input is subsequently presented later, whether during the chat session or another chat session, whether with same or different user or client, then the first chatbot 110a can avoid importing the second chatbot 110b and instead output the second output. For example, some of such learning can employ or be based on a technique from US Patent Publications 9369410, 20140279050, or 20100324908, which are fully incorporated by reference herein for all purposes.

In the block 238, the first chatbot 110a applies a second logic to the chat session, such as inclusive of the first input and the second input. The server 104a can host the second logic, such as via the first chatbot 110a hosting the second logic, or the second logic can be hosted remote to the server 104a, such as via a data source, such as a server, over the network 102. Note that the second logic can be hardware or software. For example, the second logic can include a Boolean logic, a causal conditional logic, or any other logic implemented in a circuit, a data structure, a function, a routine, a class, an object, a library, a module, a source code, an object code, or others. For example, the second logic can be embodied in an AI logic. For example, the second logic can analyze the chat session, in whole or in part, based on keywords, alphanumeric string patterns, values, image patterns, sound patters, or any other content in the chat session or metadata in the or about the chat session. Note that the second logic can be configured to process the chat session for understanding the chat session input, such as via applying a NLP technique, a machine learning technique, an optical character recognition technique, or any other computational technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. For example, the second logic can disambiguate the chat session, such as inclusive of the first input and the second input. Accordingly, once the chat session is processed for understanding, the second logic can determine whether the second input is sufficiently responsive or non-responsive to the first input. For example, the second logic can determine whether a third input, as input via the client 112 operated via the user, is indicative of the user being satisfied or not satisfied with the second input, such as being unclear or unsure of the second input. As such, if the second logic determines that the user is not satisfied with the second input, such as still being unclear or unsure of the second input or any other input from the first chatbot 110a or the second chatbot 110b, then the third logic can provide a response to the second input, escalate the chat session to attention of the client 114, or involve the third chatbot 110n. For example, the client 114 may be a supervisor client, which may have an administrative privilege with respect to the first chatbot 110a or the second chatbot 110b. Resultantly, if the second logic determines that the second logic is able to provide a response sufficiently responsive to the user after the second input upon the second logic determining that the user is not satisfied with the second input, then the second logic outputs the response to the client 112 in the chat session. Otherwise, the second logic determines that the second logic is unable to provide a response sufficiently responsive to the user after the second input and therefore the second logic escalates the chat session to an attention of the client 114 or imports the third chatbot 110n. Note that the second logic and the first logic can be distinct logics, whether co-hosted or distinctly hosted, whether local to or remote from the server 104a, whether manifested in a same or different manner or type, or same logic, such as a logic includes the first logic and the second logic. Also, note that the second logic can be applied immediately after the second input or at another time in the chat session, such as after several messages between the first chatbot 110a, the second chatbot 110b, and the user of the client 112.

In the block 240, the first chatbot 110a can prompt the user of the client 112 about inviting the client 114 or the third chatbot 110n, such as when the second logic is unable to provide a response sufficiently responsive to the user after the second input and therefore an escalation of the chat session to an attention of the client 114 or an importation of the third chatbot 110n is needed. The first chatbot 110a can generate the prompt and present the prompt during the chat session, such as in a conversation window, a pop-up window, a slide-out window, a buddy list, a browser window, a taskbar, a dropdown, or others. The prompt can request a user input of any type, such as a binary input, such as yes/no or true/false, a text input, such as an alphanumeric string ("I would like to get supervisor or another chatbot involved"), a microphone input, a camera input, a mouse/touch gesture, or others.

In the block 242, the first chatbot 110a receives a second affirmative answer from the client 112 over the network 102. The answer acknowledges the user's desire to get the client 114 or the third chatbot 110n involved, such as by presenting the chat session, in whole or in part, to the client 114 or the third chatbot 110n during the chat session.

In the block 244, the first chatbot 110a grants an access for the chat session to the client 114 or the third chatbot 110n such that the client 114 or the third chatbot 110n is logically bound to the chat session. Note that the client 114 or the third chatbot 110n can also be bound to other chat sessions with other clients in parallel to the chat session, just like the first chatbot 110a, the second chatbot 110b, or the client 112. For example, such grant can be performed via the first chatbot 110a granting a read access to the client 114 or the third chatbot 110n such that the client 114 or the third chatbot 110n accesses the server 104a and reads at least a part of the chat session starting from the first input, although the first chatbot 110a can grant the read access to the chat session, as a whole, such as from a beginning of the chat session. The first chatbot 110a can grant the access in various ways, as known to skilled artisans, such as via opening a computer port (a physical hardware interface) of the server 104a or a networking port (a virtual data connection between the first chatbot 110a and the client 114 or the third chatbot 110n), a remote login session, configuring a firewall to accept a connection with the client 114 or the third chatbot 110n, or others. In some embodiments, the first chatbot 110a can grant the access via passing on at least a part of the chat session to the client 114 or the third chatbot 110n, such as from the first input or earlier, or creating an intermediary virtual chat between the first chatbot 110a and the client 114 or the third chatbot 110n, such as when the client 114 or the third chatbot 110n is not programmed to join the chat session. Note that the access can include a read access, a write access, a delete access, or others. Further, note that if a language translation is necessary between the first chatbot 110a and the client 114 or the third chatbot 110n, then the first server 104a, such as via the first chatbot 110a, can query a network-based translation service, such as Google Translate, or query a language pack or a translation engine accessible to the server 104a, whether locally or remotely stored. As such, when the client 114 or the third chatbot 110n join the chat session, the server 104a, such via the first chatbot 110a, can seamlessly translate communications in the chat session, without the user being aware that the client 114 or the third chatbot 110n are communicating in a language different from the user.

Figure 3:
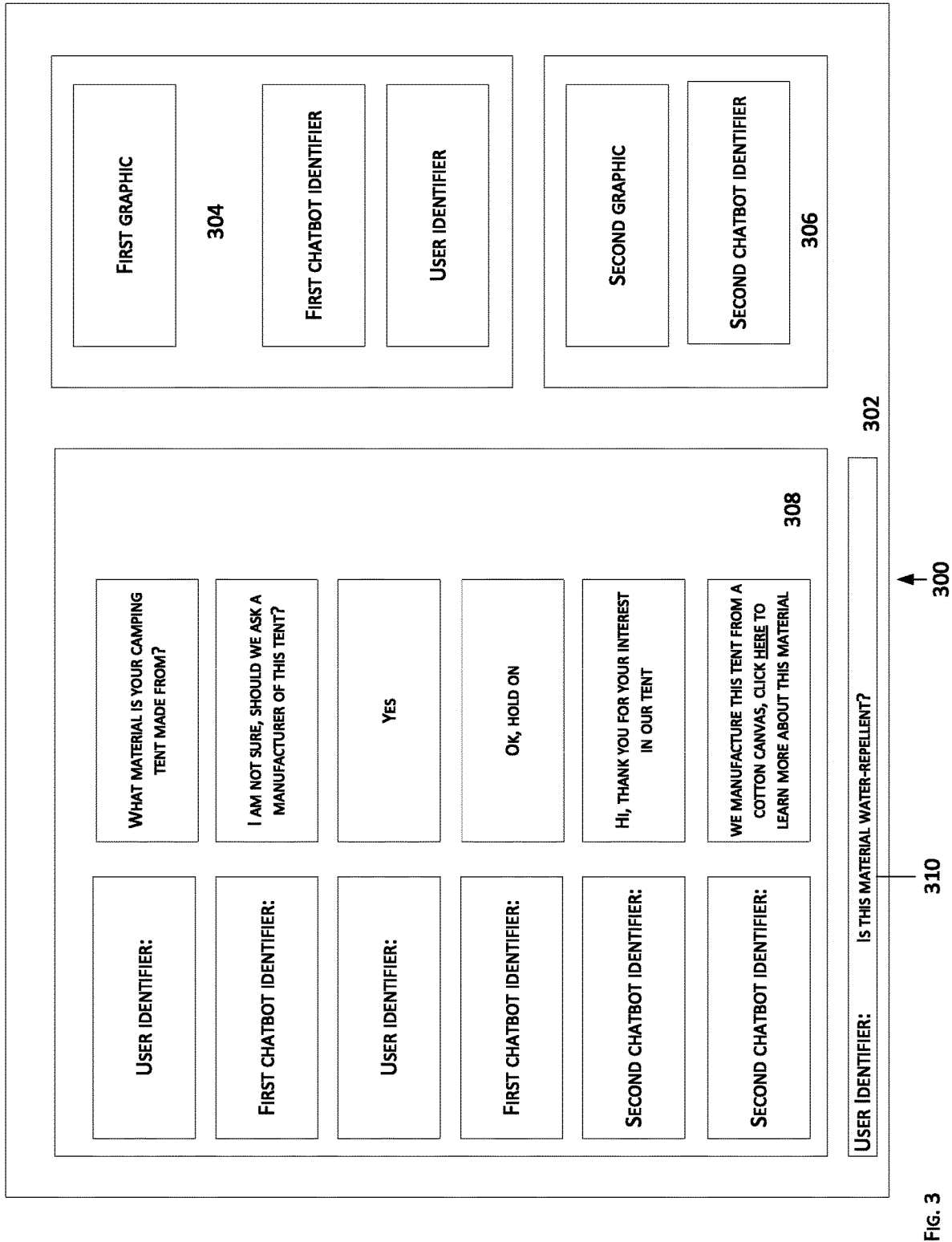
FIG. 3 shows a diagram of an embodiment of a web page depicting a chat session involving a first chatbot, a second chatbot, and a user according to this disclosure.

FIG. 3 shows a diagram of an embodiment of a web page depicting a chat session involving a first chatbot, a second chatbot, and a user according to this disclosure. In particular, the client 112 outputs a page 300 via an application, such as a web browser, running on an OS of the client 112, with the page 300 being displayed via a display of the client 112, as managed via the OS of the client 112. For example, the page 300 can output the chat session via HTML, JavaScript, Flash, ActiveX, Java, or other technologies. As shown, the page 300 depicts a portion of the process 200, as described with reference to FIG. 2.

The page 300 depicts a chat window 308 containing a first frame 304, a second frame 306, a third frame 308, and a chat input text bar 310. The first frame 304 includes a first graphic, a first chatbot identifier, and a user identifier. The first graphic can include a photo, a logo, an icon, or another image. The first chatbot identifier can include an alphanumeric string, a barcode, a photo, a logo, an icon, or another text or image. The user identifier can include an alphanumeric string, a barcode, a photo, a logo, an icon, or another text or image. The first chatbot identifier and the user identifier can be visually distinct from each other, such as via font, size, color, highlighting, spacing, or others. The second frame 306 includes a second graphic and a second chatbot identifier. The second graphic can include a photo, a logo, an icon, or another image such that the first graphic is visually distinct from the second graphic. The second chatbot identifier can include an alphanumeric string, a barcode, a photo, a logo, an icon, or another text or image such that the first chatbot identifier is visually distinct from the second chatbot identifier. The third frame 308 depicts a chat of the chat session, where the chat involves the user identifier, the first chatbot identifier, and the second chatbot identifier. The chat input text bar 310 depicts an alphanumeric input that is received from the client 112, such as via a keyboard thereof, for a user review prior to a submission of the alphanumeric input to the chatbot 110a for presentation in the chat session.

Note that the chat depicts (1) the first query from the client 112, with the first query being associated with the user identifier ("What material is your camping tent made from?"), (2) the prompt from the first chatbot 110a inquisitive of the requesting the invitation to the second chatbot 110b ("I am not sure, should we ask a manufacturer of this tent?"), (3) the binary response from the client 112, with the binary response being associated with the user identifier ("Yes"), (4) the first chatbot 110a importing the second chatbot 110b into the chat ("OK, hold on"), (5) the second chatbot 110b joining the chat ("Hi, thank you for your interest"), and (6) the second chatbot 110b outputting the second input in response to the first input ("We manufacture this tent from a cotton canvas, click here to learn more about this material"). Further, note that the second input can include a logical address, a network address, or a hyperlink, such underlined in the second input from the second chatbot 110b. Moreover, note that the chat input text bar 310 depicts an alphanumeric response to the second input that has not yet been submitted by the user via the client 112 ("Is this material water-repellent?").

Figure 4:
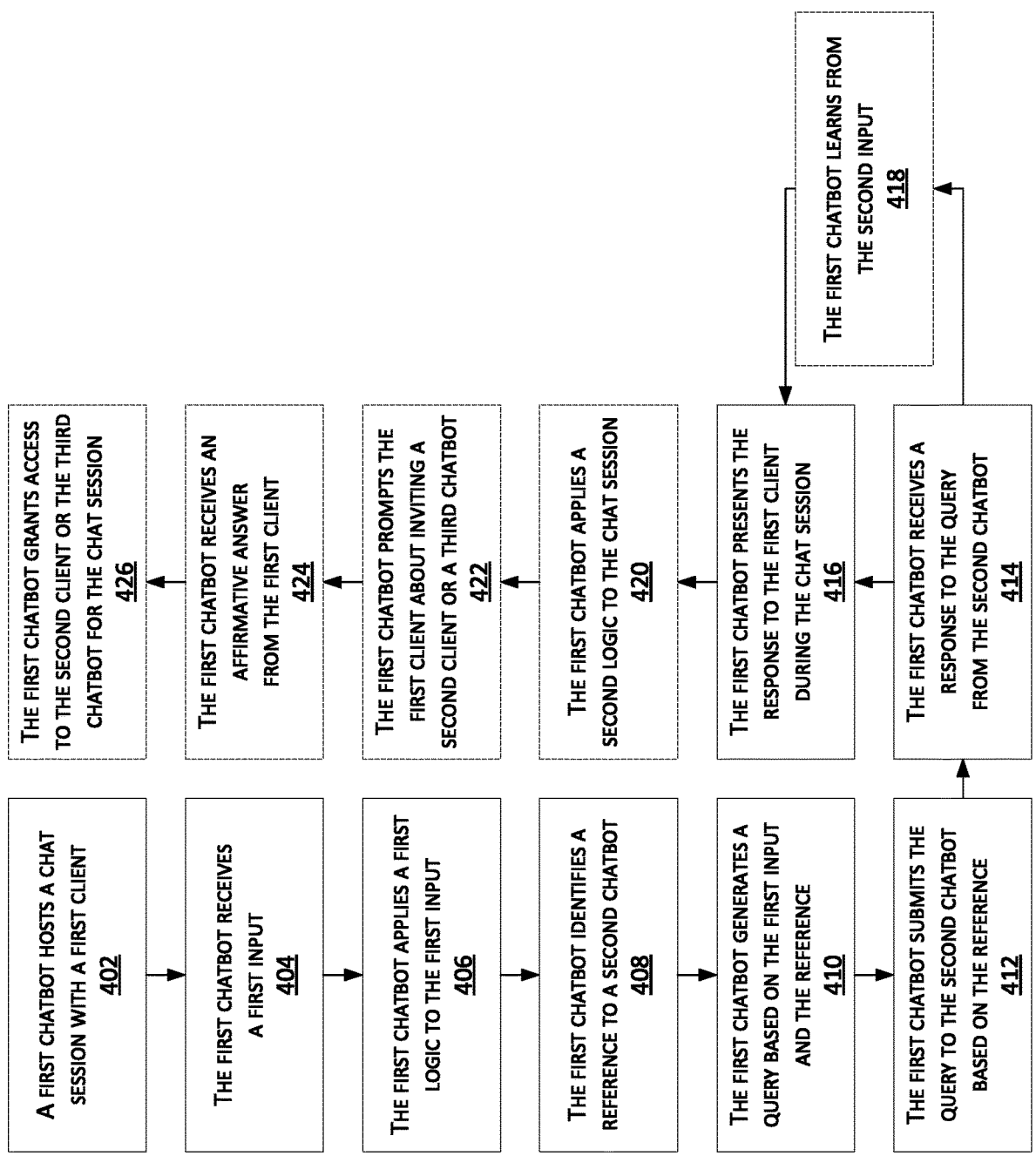
FIG. 4 shows a flowchart of an embodiment of a process for a first chatbot to host a chat session with user and to query a second chatbot without the user's knowledge according to this disclosure.

FIG. 4 shows a flowchart of an embodiment of a process for a first chatbot to host a chat session with user and to query a second chatbot without the user's knowledge according to this disclosure. In particular, a process 400 is used for the first chatbot 110a to host the chat session with the user, such as via the client 112, and to query the second chatbot 110b without the user's knowledge. The process 400 includes a plurality of blocks 402-426.

In the block 402, the first chatbot 110a hosts the chat session with the first client 112. Note that the chat session can be implemented via HTML, JavaScript, Flash, ActiveX, Java, or other technologies.

In the block 404, the first chatbot 110a receives a first input, such as an alphanumeric string, an audio file, an image file, a barcode, or others. For example, the alphanumeric string can include a query, such as "What material is this camping tent made from?" Note that the first input can be received when the client 112 is accessing a web page associated with a specific database record, such as an e-commerce product, whether good or service, such that the specific database record or the web page is bound to the chat session In the block 406, the first chatbot 110a applies a first logic to the first input. The server 104a can host the first logic, such as via the first chatbot 110a hosting the first logic, or the first logic can be hosted remote to the server 104a, such as via a data source, such as a server, over the network 102. Note that the first logic can be hardware or software. For example, the first logic can include a Boolean logic, a causal conditional logic, or any other logic implemented in a circuit, a data structure, a function, a routine, a class, an object, a library, a module, a source code, an object code, or others. For example, the first logic can be embodied in an AI logic. For example, the first logic can analyze the first input based on keywords, alphanumeric string patterns, values, image patterns, sound patters, or any other content in the first input or metadata in the or about the first input. Note that the first logic can be configured to process the first input for understanding the first input, such as via applying an natural language processing (NLP) technique, a machine learning technique, an optical character recognition technique, or any other computational technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. For example, the first logic can disambiguate the first input. Accordingly, once the first input is processed for understanding, the first logic can determine whether the first logic can provide a response to the first input. If the first logic determines that the first logic is able to provide the response, then the first logic outputs the response to the client 112 in the chat session. Otherwise, the first logic determines that the first logic is unable to provide the response to the first input.

In the block 408, the first chatbot 110a identifies a reference to the second chatbot 110b. For example, the reference can include an alphanumeric, binary, or hexadecimal string, an image or sound file, a barcode, a document, a registry entry, an application setting, or others. The reference can include a logical address, a network address, a chatbot identifier or name, or a hyperlink that refers to the second chatbot 110b. For example, the reference can include a value that enables the first chatbot 110a to access the second chatbot 110b by referring to the second chatbot 110b. The first chatbot 110a identifies the reference based on the first logic or via the first logic. The first chatbot 110a identifies the reference as statically preset or as dynamically selected from a set of chatbot references accessible to the first chatbot 110a, such as when the set of chatbot references is local to the server 104a, such as via the first chatbot 110a hosting the set of chatbot references, or remote from the server 104a, such as via a data source, such as a server, over the network 102. For example, when the chatbot reference is statically preset, then the first chatbot 110a identifies the chatbot reference to the second chatbot 110b, as preprogrammed, such as via a one-to-one correspondence therebetween, such as when the second chatbot 110b is smarter than the first chatbot 110a or the second chatbot 110b has access to data or logic, whether local to or remote therefrom, to which the first chatbot 110a does not. In contrast, when the chatbot reference is dynamically selected from the set of chatbot references, then the first chatbot 110a applies a set of criteria, whether local to or remote from the first chatbot 110a, to the first input and then matches an output from such application to a set of variables one-to-one corresponding to the set of the chatbot references, such as via a hash manner, in order to determine which chatbot reference from the set of chatbot references should be selected or is most suitable. For example, when the chatbot reference is statically preset, then the first chatbot 110a can identify the reference to the second chatbot 110b since the first chatbot 110a is programmed to do so. In contrast, when the reference is dynamically selected from the set of chatbot references, then the first chatbot 110a applies the set of criteria to the first input, such as a set of knowledge category criteria stored local to the first chatbot 110a, and then matches an output of such application, such as an alphanumeric value, to the set of variables one-to-one corresponding to the set of the chatbot references, such as a set of alphanumeric values or others. For example, if the output of such application is a value 5, then the first chatbot 110a determines if the value 5 matches to any member of the set of variables. If so, then the first chatbot 110a identifies which chatbot reference from the set of chatbot references corresponds to that matching member. Note that the set of chatbot references can include a catchall chatbot reference or a default chatbot reference for use cases where such matching is not made or for use in default circumstances. Also, note that the set of variables can be adjusted, such as via a maintenance update.

In the block 410, the first chatbot 110a generates a query based on the first input and the reference. The generation can include copying the first input from the chat session and optionally modifying the first input, as suitable based on the reference, although the first input, as originally input via the client 112 can be used, without any modification. For example, if a chatbot associated with the reference is programmed to receive an input in a certain format, content, or language, then the first chatbot 110a can modify the first input to comply with such format, content, or language, such as via editing the first input, whether locally or remotely, or translating the first input, as disclosed herein. Note that the reference may include or be associated with a data structure or a record, whether locally or remotely stored, containing data relevant to such modification such that when the first chatbot 110a decides to modify the first input, then the first chatbot 110a can query the data structure or the record, such as over the network 102, and the modify accordingly. Note that the query can include more than the first input, such as the chat session, in whole or in part, as set via the reference. For example, if the reference or the data structure or the record mandate that the chat session, as a whole, be submitted, or a specified portion of the chat session be submitted, such as last twenty lines, then the first chatbot 110a generates the query to be compliant with such mandate.

In the block 412, the first chatbot 110a submits the query to the second chatbot based on the reference. Such submission can be over the network 102, such as via the first chatbot 110a accessing the second chatbot 110b over the network 102, initiating a chat session therebetween, and then entering the query into this chat session. Such submission can be synchronous or asynchronous, encrypted or unencrypted, or any other way, such as via a REST API. When the second chatbot 110b is associated with an API, then the first chatbot 110a can submit the query via interfacing with the API. The API is local to the second chatbot 110b, such as when the second chatbot 110b includes the API, or the API is remote from the second chatbot 110b, such as via a data source, such as a data feed or another server. The server 104a can translate, such as via the first chatbot 110a, during the chat session, the set of parameters into a set of instructions executable via the second chatbot 110b, where the first chatbot 110a submits the query through the set of instructions. For example, the first chatbot 110a can submit the query via a JSON data structure. For example, the query can include a callback, such as an executable code that is passed as an argument to another code, which is expected to call back (execute) the argument at a given time, such as responsively, where this execution may be immediate, such as in a synchronous callback, or not immediate, such as at a later time, such as in an asynchronous callback, where the executable code specifies a function or subroutine as an entity that may be similar to a variable and as implementably supported via a subroutine, a lambda expression, a code block, or a function pointer.

When the first chatbot 110a and the second chatbot 110b are programmed to receive user inputs in different user languages, such as English and Russian, the server 104a can translate the query from a first language, such as English, into a text in a second language, such as Russian, where the query includes the text in the second language, i.e. Russian. Note that the server 104a can translate the second input translated from Russian into English before presenting in the chat session, such as when the second chatbot 110b outputs in Russian. Note that these languages are illustrative and other languages can be used, such as Arabic, Hispanic, French, German, Japanese, Hebrew, Korean, Hindi, and others. For example, such translation can occur via the server 104a or the server 104b querying a network-based translation service, such as Google Translate, or query a language pack or a translation engine accessible to the server 104a, whether locally or remotely stored.

In the block 414, the first chatbot 110a receives a response, such as the second input, to the query from the second chatbot 110b over the network 102. The response can include data of any type, such as alphanumerics, binary, image, sound, or others, whether encrypted or unencrypted, whether in readable form or non-readable form, whether in a form ready for inserting into the chat session or in a form needing conversion or translation into a form ready for inserting into the chat session. Note that the second chatbot 110b can, whether locally or remotely, process the query, identify an answer to the query, whether via self-querying or querying another data source, such as the database 116 or another chatbot, such as the third chatbot 110n over the network 102, and generate the response based on the answer, and send the response to the first chatbot 110a. Note that the second chatbot 110b can be bound to other chat sessions with other clients in parallel to the chat session, just like the first chatbot 110a.

In the block 416, the first chatbot 110a presents the response to the client 112 during the chat session in the chat session, such as in a conversation window. For example, the first chatbot 110a can copy the response and insert, such as via writing, a copy of the response into the conversation window involving the user operating client 112 and the first chatbot 110a. As such, the user is unaware of a fact that the first chatbot 110a seamlessly queried the second chatbot 110b over the network 102 for the answer to the first input.

In the block 418, the first chatbot 110a learns from the response such that when similar or same input such as the first input is subsequently presented later, whether during the chat session or another chat session, whether with same or different user or client, then the first chatbot 110a can avoid background querying of the second chatbot 110b and instead output the response. For example, some of such learning can employ or be based on a technique from US Patent Publications 9369410, 20140279050, or 20100324908, which are fully incorporated by reference herein for all purposes.

In the block 420, the first chatbot 110a applies a second logic to the chat session, such as inclusive of the first input and the response. The server 104a can host the second logic, such as via the first chatbot 110a hosting the second logic, or the second logic can be hosted remote to the server 104a, such as via a data source, such as a server, over the network 102. Note that the second logic can be hardware or software. For example, the second logic can include a Boolean logic, a causal conditional logic, or any other logic implemented in a circuit, a data structure, a function, a routine, a class, an object, a library, a module, a source code, an object code, or others. For example, the second logic can be embodied in an AI logic. For example, the second logic can analyze the chat session, in whole or in part, based on keywords, alphanumeric string patterns, values, image patterns, sound patters, or any other content in the chat session or metadata in the or about the chat session. Note that the second logic can be configured to process the chat session for understanding the chat session input, such as via applying a NLP technique, a machine learning technique, an optical character recognition technique, or any other computational technique. For example, the machine learning technique can include a decision tree learning technique, an association rule learning technique, an artificial neural network technique, a deep learning technique, an inductive logic programming technique, a support vector machine technique, a clustering technique, a Bayesian network technique, a reinforcement learning technique, a representation learning technique, a similarity and metric learning technique, a sparse dictionary learning technique, a genetic algorithm technique, a rule-based machine learning technique, a learning classifier system technique, or any others. For example, the second logic can disambiguate the chat session, such as inclusive of the first input and the response. Accordingly, once the chat session is processed for understanding, the second logic can determine whether the response is sufficiently responsive or non-responsive to the first input. For example, the second logic can determine whether a third input, as input via the client 112 operated via the user, is indicative of the user being satisfied or not satisfied with the response, such as being unclear or unsure of the response. As such, if the second logic determines that the user is not satisfied with the response, such as still being unclear or unsure of the response or any other input from the first chatbot 110a or the second chatbot 110b, then the third logic can provide a reply to the response, escalate the chat session to attention of the client 114, or involve the third chatbot 110n. For example, the client 114 may be a supervisor client, which may have an administrative privilege with respect to the first chatbot 110a or the second chatbot 110b. Resultantly, if the second logic determines that the second logic is able to provide a reply sufficiently responsive to the user after the response upon the second logic determining that the user is not satisfied with the response, then the second logic outputs the reply to the client 112 in the chat session. Otherwise, the second logic determines that the second logic is unable to provide a reply sufficiently responsive to the user after the response and therefore the second logic escalates the chat session to an attention of the client 114 or imports the third chatbot 110n. Note that the second logic and the first logic can be distinct logics, whether co-hosted or distinctly hosted, whether local to or remote from the server 104a, whether manifested in a same or different manner or type, or same logic, such as a logic includes the first logic and the second logic. Also, note that the second logic can be applied immediately after the response or at another time in the chat session, such as after several messages between the first chatbot 110a, the second chatbot 110b, and the user of the client 112.

In the block 422, the first chatbot 110a can prompt the user of the client 112 about inviting the client 114 or the third chatbot 110n, such as when the second logic is unable to provide a reply sufficiently responsive to the user after the response and therefore an escalation of the chat session to an attention of the client 114 or an importation of the third chatbot 110n is needed. The first chatbot 110a can generate the prompt and present the prompt during the chat session, such as in a conversation window, a pop-up window, a slide-out window, a buddy list, a browser window, a taskbar, a dropdown, or others. The prompt can request a user input of any type, such as a binary input, such as yes/no or true/false, a text input, such as an alphanumeric string ("I would like to get supervisor or another chatbot involved"), a microphone input, a camera input, a mouse/touch gesture, or others.

In the block 424, the first chatbot 110a receives an affirmative answer from the client 112 over the network 102. The answer acknowledges the user's desire to get the client 114 or the third chatbot 110n involved, such as by presenting the chat session, in whole or in part, to the client 114 or the third chatbot 110n during the chat session.

In the block 426, the first chatbot 110a grants an access for the chat session to the client 114 or the third chatbot 110n such that the client 114 or the third chatbot 110n is logically bound to the chat session. Note that the client 114 or the third chatbot 110n can also be bound to other chat sessions with other clients in parallel to the chat session, just like the first chatbot 110a, the second chatbot 110b, or the client 112. For example, such grant can be performed via the first chatbot 110a granting a read access to the client 114 or the third chatbot 110n such that the client 114 or the third chatbot 110n accesses the server 104a and reads at least a part of the chat session starting from the first input, although the first chatbot 110a can grant the read access to the chat session, as a whole, such as from a beginning of the chat session. The first chatbot 110a can grant the access in various ways, as known to skilled artisans, such as via opening a computer port (a physical hardware interface) of the server 104a or a networking port (a virtual data connection between the first chatbot 110a and the client 114 or the third chatbot 110n), a remote login session, configuring a firewall to accept a connection with the client 114 or the third chatbot 110n, or others. In some embodiments, the first chatbot 110a can grant the access via passing on at least a part of the chat session to the client 114 or the third chatbot 110n, such as from the first input or earlier, or creating an intermediary virtual chat between the first chatbot 110a and the client 114 or the third chatbot 110n, such as when the client 114 or the third chatbot 110n is not programmed to join the chat session. Note that the access can include a read access, a write access, a delete access, or others. Further, note that if a language translation is necessary between the first chatbot 110a and the client 114 or the third chatbot 110n, then the first server 104a, such as via the first chatbot 110a, can query a network-based translation service, such as Google Translate, or query a language pack or a translation engine accessible to the server 104a, whether locally or remotely stored. As such, when the client 114 or the third chatbot 110n join the chat session, the server 104a, such via the first chatbot 110a, can seamlessly translate communications in the chat session, without the user being aware that the client 114 or the third chatbot 110n are communicating in a language different from the user.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain embodiments may be combined and sub-combined in and/or with various other embodiments. Also, different aspects and/or elements of embodiments, as disclosed herein, may be combined and sub-combined in a similar manner as well. Further, some embodiments, whether individually and/or collectively, may be components of a larger system, wherein other procedures may take precedence over and/or otherwise modify their application. Additionally, a number of steps may be required before, after, and/or concurrently with embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the terms "below" and "lower" can encompass both an orientation of above and below.

The terminology used herein is for describing particular embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
reading, by a server, a chat query from a client in a chat session involving the client and a first chatbot;
identifying, by the server, a reference to a second chatbot during the chat session responsive to the first chatbot at least one of not being able to answer the chat query during the chat session or not knowing the answer to the chat query during the chat session;
generating, by the server, a chatbot query during the chat session based on the chat query and the reference responsive to the chat query;
submitting, by the server, the chatbot query to the second chatbot during the chat session based on the reference responsive to the chat query;
receiving, by the server, a response to the chatbot query from the second chatbot during the chat session responsive to the chat query;
converting, by the server, the response into a chat message during the chat session responsive to the chat query; and
inserting, by the server, the chat message into the chat session during the chat session responsive to the chat query, wherein the chat query precedes the chat message, wherein the chat message is associated with the first chatbot during the chat session;

inserting, by the server, a second chat message from the first chatbot into the chat session, wherein the second chat message inquires about extending an invitation to at least one of a second client or a third chatbot into the chat session, wherein the first chat message precedes the second chat message;

in response to receiving an authorization from the client:
inviting, by the server, at least one of the second client or the third chatbot to the chat session; and
granting, by the server, an access for the chat session to the at least one of the second client or the third chatbot during the chat session.

2. The method of claim 1, wherein the first chatbot is not able to answer the chat query during the chat session.

3. The method of claim 1, wherein the first chatbot does not know the answer to the chat query during the chat session.

4. The method of claim 1, wherein the second chatbot is associated with an API, wherein the first chatbot submits the chatbot query to the second chatbot via interfacing with the API.

5. The method of claim 4, wherein the API is local to the second chatbot.

6. The method of claim 5, wherein the second chatbot includes the API.

7. The method of claim 1, further comprising:
translating, by the server, the chat query from a first language into a text in a second language, wherein the chatbot query includes the text in the second language.

8. The method of claim 1, wherein the second chatbot is programmed to query to a data source based on the chatbot query and to receive a reply in response thereto, wherein the response includes the reply.

9. The method of claim 8, wherein the data source includes a third chatbot.

10. The method of claim 1, wherein the invitation is to the second client.

11. The method of claim 1, wherein the invitation is to the third chatbot.

12. The method of claim 1, further comprising:
training, by the server, the first chatbot based on the response during the chat session.

13. The method of claim 1, further comprising:
translating, by the server, the chatbot query into a set of instructions executable via the second chatbot during the chat session, wherein the first chatbot submits the chatbot query through the set of instructions.

14. The method of claim 1, wherein the chat message includes a hyperlink relating to the chat query.

15. The method of claim 1, wherein the chat message includes an image relating to the chat query.

16. A system comprising:
a server configured to:
read a chat query from a client in a chat session involving the client and a first chatbot;
identify a reference to a second chatbot during the chat session responsive to the first chatbot at least one of not being able to answer the chat query during the chat session or not knowing the answer to the chat query during the chat session;
generate a chatbot query during the chat session based on the chat query and the reference responsive to the chat query;
submit the chatbot query to the second chatbot during the chat session based on the reference responsive to the chat query;
receive a response to the chatbot query from the second chatbot during the chat session responsive to the chat query;
convert the response into a chat message during the chat session responsive to the chat query; and
insert the chat message into the chat session during the chat session responsive to the chat query, wherein the chat query precedes the chat message, wherein the chat message is associated with the first chatbot during the chat session;
insert a second chat message from the first chatbot into the chat session, wherein the second chat message inquires about extending an invitation to at least one of a second client or a third chatbot into the chat session, wherein the first chat message precedes the second chat message;
in response to receiving an authorization from the client:
invite at least one of the second client or the third chatbot to the chat session; and
grant an access for the chat session to the at least one of the second client or the third chatbot during the chat session.

17. The system of claim 16, wherein the first chatbot is not able to answer the chat query during the chat session.

* * * * *